US008531571B1

(12) United States Patent
Côté

(10) Patent No.: US 8,531,571 B1
(45) Date of Patent: Sep. 10, 2013

(54) SYSTEM AND METHOD FOR BROWSING A LARGE DOCUMENT ON A PORTABLE ELECTRONIC DEVICE (75) Inventor: Stéphane Côté, Lac Beauport (CA)

(73) Assignee: Bentley Systmes, Incorporated, Exton, PA (US)

( * ) Notice: Subject to any disclaimer, the term of this patent is extended or adjusted under 35 U.S.C. 154(b) by 722 days.

(21) Appl. No.: 12/536,284

(22) Filed: Aug. 5, 2009

(51) Int. Cl.
H04N 5/222 (2006.01)
G06F 3/033 (2006.01)

(52) U.S. Cl.
USPC ............ 348/333.01; 348/333.06; 348/333.12; 345/158

(58) Field of Classification Search
USPC ......................... 348/333.01, 333.12
See application file for complete search history.

(56) References Cited

U.S. PATENT DOCUMENTS

| 6,084,594 | A | 7/2000 | Goto | |
|---|---|---|---|---|
| 6,262,769 | B1 | 7/2001 | Anderson et al. | |
| 6,573,883 | B1 * | 6/2003 | Bartlett | 345/156 |
| 7,607,111 | B2 * | 10/2009 | Vaananen et al. | 715/864 |
| 7,903,084 | B2 * | 3/2011 | Marvit et al. | 345/156 |
| 7,966,146 | B2 * | 6/2011 | Shkolnikov | 702/141 |
| 8,018,435 | B2 * | 9/2011 | Orchard et al. | 345/158 |
| 2001/0048423 | A1 * | 12/2001 | Rekimoto | 345/157 |
| 2002/0190947 | A1 * | 12/2002 | Feinstein | 345/158 |
| 2003/0025812 | A1 * | 2/2003 | Slatter | 348/240.2 |
| 2004/0027330 | A1 * | 2/2004 | Bradski | 345/158 |
| 2006/0107213 | A1 | 5/2006 | Kumar et al. | |
| 2007/0268246 | A1 * | 11/2007 | Hyatt | 345/156 |
| 2009/0034800 | A1 * | 2/2009 | Vau et al. | 382/107 |

FOREIGN PATENT DOCUMENTS

WO WO 01/86920 A2 * 11/2001

OTHER PUBLICATIONS

Yim, Sunghoon, et al., "Image Browsing in Mobile Device Using User Motion Tracking," International Symposium on Ubiquitous VR, 2007, pp. 1-2.
Rekimoto, Jun, "Tilting Operations for Small Screen Interfaces (Tech Note)," Sony Computer Science Laboratory, Inc., 1996, pp. 1-2.
Haro, Antonio, et al., "Mobile Camera-Based Adaptive Viewing," Nokia Research Center, 2005, pp. 1-6.
Hachet, Martin, et al., "A Camera-Based Interface for Interaction with Mobile Handheld Computers," IPARLA Project, LaBRI-INRIA, University of Bordeaux, 2005, pp. 1-7.

* cited by examiner

Primary Examiner — Ngoc-Yen Vu
(74) Attorney, Agent, or Firm — Cesari and McKenna, LLP (57) ABSTRACT In one embodiment, a technique for browsing a document on a portable electronic device is disclosed. The document is opened and displayed in a document browsing application. A state of a user-selectable activation control disposed on the device is determined. In response to the activation control being in a selected state, orientation data is read from a sensor of the device. From the orientation data, it is determined if the device has rotated in a first predetermined direction about an axis that extends through a center of the device. If so, the application zooms in on a portion of the document being displayed. Further, from the orientation data, it is determined if the device has turned in reference to a fixed coordinate system. If so, the application pans up, down, left or right. In response to the activation control being in a released state, zooming and/or panning ceases.

20 Claims, 7 Drawing Sheets

SYSTEM AND METHOD FOR BROWSING A LARGE DOCUMENT ON A PORTABLE ELECTRONIC DEVICE

BACKGROUND

1. Technical Field

The present disclosure relates generally to document browsing on a portable electronic device, and more specifically to techniques for panning and zooming in a large document, such as a computer aided design (CAD) drawing, in response to orientation of the portable electronic device.

2. Background Information

It is increasingly common for users to access and browse documents on portable electronic devices, such as ultra mobile personal computers (PCs) (collectively UMPCs), tablet PCs, personal digital assistant (PDAs), electronic book (e-book) readers, cellular telephones, digital cameras, and the like, rather than use paper copies (e.g., "hard copies") of the documents. The use of portable electronic devices has relieved users of the burden of maintaining and transporting large volumes of paper while in the field. However, limitations of many portable electronic devices have hindered the document browsing experience. These limitations are particularly acute when a user attempts to browse or otherwise interact with a "large" document, i.e., a document whose dimensions and/or level of detail is such that it cannot be displayed at a discernable size all at once on a display screen of a portable electronic device.

Browsing large documents on a portable electronic device using conventional techniques is typically a frustrating endeavor. Navigation about a large document is often difficult, since portable electronic devices typically have small navigation controls (e.g., small buttons). A user may have difficulty selecting a desired navigation control, due to its size and proximity to other controls. Similarly, a user may have difficulty manipulating the navigation control in a precise manner once selected, due to its small size.

This difficulty is often compounded by the small size of the display screen found on most portable electronic devices. With a small display screen, a user typically can only view a small portion of a large document at any one time (with features displayed at a discernable size). The smaller the display screen, the more a user must pan about a large document, to view different portions of it. Further, the smaller the display screen, the more a user must zoom in and zoom out of the document, to select areas of the document to view in more detail, and then return to a global view. Consequently, the small display screen included in many portable electronic devices increases the frequency a user must manipulate the small navigation controls, compounding the frustration.

While these issues occur in many different types of applications involving browsing large documents on portable electronic devices, one application in which these issues are particularly acute is the browsing of CAD drawings. CAD drawings typically have large dimensions and include significant low-level detail. As such, a builder, engineer, architect or other user attempting to browse a CAD drawing on a portable electronic device typically must pan and zoom repeatedly, to see the low-level detail of the drawing, and to understand the overall design. Yet, as discussed above, such panning and zooming may turn out to be a frustrating ordeal using conventional navigation controls.

Several strategies have been proposed to attempt to alleviate some of the issues of browsing large documents on portable electronic devices. However, such previously proposed strategies have notable shortcomings. For example, it has been proposed to provide larger displays on portable electronic devices. However, this may add unwanted size to the devices, decreasing their portability, while also significantly increasing their manufacturing cost. Similarly, various schemes have been proposed for providing enhanced pointing devices, for example, integrating larger, more responsive touch pads or touch screens into the devices. Yet again, this may impact the portability of the devices and significantly increase manufacturing cost.

Some have proposed avoiding the use of a pointing device altogether, and, instead, detecting movement applied to the portable electronic device itself. This detected movement would then be used to control navigation within a document. However, these schemes also have had significant shortcomings. Such schemes typically have relied on an accelerometer to detect movement applied to the portable electronic device. The inclusion of an accelerometer may add unwanted expense and complexity to the device. Further, an accelerometer has intrinsic limitations in the type of information it can provide and the calibration it requires. For example, an accelerometer typically will suffer from "drift" over time, and requires periodic reset by a user to return acceptably accurate results.

Further, previously proposed schemes that looked to movement applied to a portable electronic device, have generally required extreme and/or uncomfortable movements to perform certain types of navigation. For example, a user may be required to move the device through a large angle (e.g., an angle greater than 720°) without pause, to perform certain types of navigation. Similarly, a user may be required to perform complex simultaneous movements and tilts, challenging their manual dexterity. Accordingly, a user may find browsing a document using one of these previously proposed schemes to be difficult, non-intuitive and generally frustrating.

Accordingly, there is a need for improved techniques for browsing large documents on a portable electronic device, and in particular for panning and zooming within a large document being displayed on a portable electronic device.

SUMMARY

In one embodiment, the shortcomings of the prior art are addressed by a novel large document browsing technique that uses the orientation of a portable electronic device, in conjunction with the state of a user-selectable activation control (e.g., an activation button), to control navigation within a document (e.g., a large document) being displayed on a display screen of the portable electronic device. By selecting (e.g., pressing) the activation control, and turning and/or rotating the portable electronic device through a series of limited and comfortable movements, a user may navigate within the document being displayed on the portable electronic device, panning and zooming in a precise manner.

Specifically upon launch of a browsing tool, an orientation sensor rigidly coupled to the body of the portable electronic device, or one or more devices configured to simulate the operation of an orientation sensor, is initialized and begin capturing orientation data. The orientation data preferably indicates the portable electronic device's orientation in space substantially in real-time. When an activation control (e.g., the activation button) disposed on the exterior of the body of the portable electronic device is selected (e.g., pressed), the orientation data is read, until the activation control is released (e.g., unpressed). The orientation data is translated substantially in real-time into navigation commands.

To pan within a large document, the user selects the activation control (e.g., the activation button), and turns the device left, right, up, down or a combination thereof. That is, the user selects the activation control (e.g., the activation button), and changes the yaw, pitch or both, of the portable electronic device relative to a fixed reference coordinate system. These movements are translated by the browsing tool, preferably at a fixed gain, to corresponding left, right, up or down pans within the large document shown in the document browsing application. When the activation control is released, panning is ceased, and further turning (i.e. yaw or pitch) applied to the portable electronic device does not cause further panning within the document. A user who desires to pan through a large area simply selects the activation control, turns (i.e. yaws or pitches) the device through a comfortable range or motion, releases the activation control, returns the device to its original orientation (or any other comfortable starting orientation), and repeats as many times as needed to achieve the desired pan.

To zoom within the large document, the user selects the activation control (e.g., the activation button), and rotates the portable electronic device clockwise or counter clockwise about an axis extending through the center of the device. That is, the user selects the activation control (e.g., the activation button), and changes the roll of the portable electronic device. A rotation (i.e. roll) in a first predetermined direction (e.g., clockwise) is translated by the browsing tool to a "zoom in" command, while a rotation (i.e. roll) in a second predetermined direction (e.g., counterclockwise) is translated to a "zoom out" command. When the activation control is released, zooming is ceased, and further rotation (i.e. roll) applied to the portable electronic device does not cause further zooming within the document. A user who desires to zoom though a large range simply selects the activation control, rotates (i.e. rolls) the device through a comfortable range (e.g., a rotation of up to 90°), releases the activation control, returns the device to its original orientation (or any other comfortable starting orientation), and repeats as many times as needed to achieve the desired change in zoom.

In such manner, a user may individually pan or zoom within a document (e.g., a large document) displayed on a portable electronic device in a precise manner, using comfortable and intuitive movements. Further, by combining pan and zoom movements, a user may simultaneously, or nearly-simultaneously, pan and zoom within the document. For instance, a user may select the activation control (e.g., the activation button), rotate the portable electronic device clockwise or counter clockwise to zoom, while simultaneously, or nearly-simultaneously turning the device to pan. Such operation may be particularly advantageous for "recentering" upon a desired portion of the document, should a user find they are zooming in slightly off from their intended target.

BRIEF DESCRIPTION OF THE DRAWINGS

The detailed description below refers to the accompanying drawings, of which.

DETAILED DESCRIPTION

I. Definition of Terms

As used herein the term "document" shall be understood to refer to a two-dimensional or three-dimensional representation displayable on an electronic device. A document may include text, graphics, or a combination thereof, and, for example, may be maintained in an electronic file stored on a computer-readable medium, such as a memory or hard disk. A document may represent a variety of types of information, including a computer aided design (CAD) drawing, a blueprint, a schematic, an elevation, a text listing, an image, etc. As used herein, a document shall not include paper copies (e.g. "hard copies") of such information.

As used herein the term "large document" shall be understood to refer a document whose dimensions and/or level of detail is such that it cannot be displayed at a discernable size all at once on a display screen of a portable electronic device.

As used herein the term "portable electronic device" shall be understood to refer to an electronic device capable of displaying a document and that is adapted to be readily transportable by a user, for example, is adapted to be carried by the user on their person. A "portable electronic device" may be an ultra mobile personal computer (PC) (collectively UMPC), a tablet PC, a personal digital assistant (PDA), an electronic book (e-book) reader, a cellular telephone, a digital camera, or other similar type of electronic device.

As used herein the term "panning" shall be understood to refer to horizontal or vertical shifting of a displayed portion of a document on a display screen, for example, the display screen of a portable electronic device. A horizontal or vertical "scroll" may be considered an example of "panning".

As used herein the term "zooming" shall be understood to refer to changing the size or magnification of one or more features in a document being displayed on a display screen, for example, the display screen of a portable electronic device. If one "zooms in" they are shown a smaller portion of the document but with features having an increased size, while if one "zooms out" they are shown a larger portion the document, but with features having a decreased size. A change in "magnification" may be considered an example of "zooming."

Finally, as used herein the term "orientation sensor" shall be understood to refer to a device that can measure its own orientation in space, in absolute or relative terms, in one or more dimensions (for example, in three dimensions) in substantially real-time. An orientation sensor may be electro-mechanical, optical, or otherwise designed.

II. Example Embodiments

Figure 1:
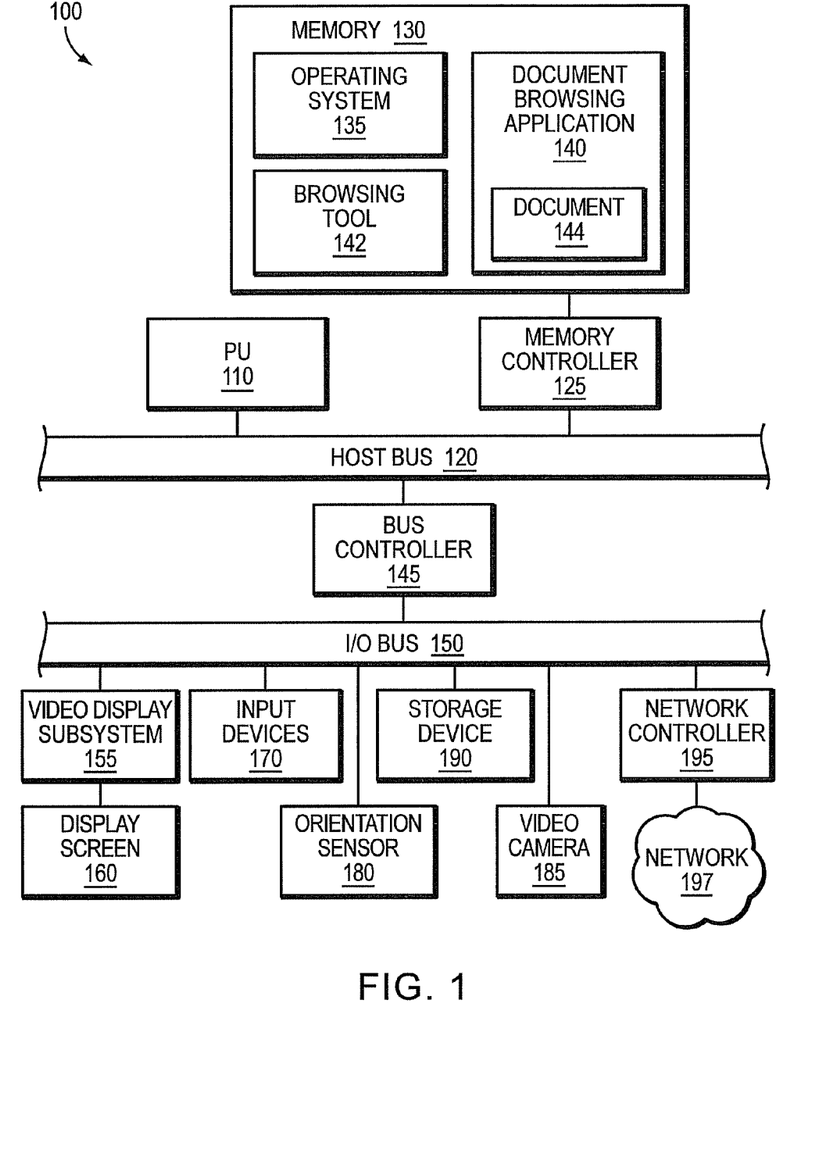
FIG. 1 is a schematic block diagram of an example portable electronic device in which at least some of the presently described techniques may be employed.

FIG. 1 is a schematic block diagram of an example portable electronic device 100 in which at least some of the presently described techniques may be employed. The portable electronic device 100 includes at least one processing unit (PU) 110 coupled to a host bus 120. The PU 110 may be any of a variety of commercially available processors, such as an Intel x86 processor, or another type of processor. A volatile memory 130, such as a Random Access Memory (RAM), is coupled to the host bus 120 via a memory controller 125. The memory 130 is adapted to store at least a portion of an operating system 135 while the portable electronic device 100 is operating.

In addition, the memory 130 may store portions of application software, including portions of a document browsing application 140 and a browsing tool 142, as well as data, such as a document (e.g. a large document) 144. The document browsing application 140 may take any of a variety of forms. For example, the document browsing application 140 may be a drawing (DWG) file, design (DGN) file and/or computer aided design (CAD) file viewer, such as Bentley® View, available from Bentley Systems, Inc. of Exton, Pa., or a Digital InterPlot File (DPR) file viewer, such as Bentley® VPR Viewer, also available from Bentley Systems, Inc. Alternatively, the document browsing application may be a web-browser, such as Windows® Internet Explorer available from Microsoft Corp. of Redmond, Wash.; a Portable Document Format (PDF) viewer, such as Adobe® Reader available from Adobe Systems, Inc. of San Jose, Calif.; or another type of application capable of displaying documents. The browsing tool 142 similarly may take any of a variety of forms. For example, the browsing tool 142 may be a driver. Alternatively, the browsing tool may be an object or routine of a larger application, for example, of the document browsing application 140. As explained further below, when activated, the document browsing tool 142 translates orientation data into corresponding navigation commands, according to the novel large document browsing techniques described herein. Finally, the document 144 may take any of a variety of forms. For example, it may be stored as a DWG file, a DGN file, a CAD file, a PDF file, a webpage, or other type of file.

The host bus 120 of the portable electronic device 100 is coupled to an input/output (I/O) bus 150 through a bus controller 145. A video display subsystem 155, coupled to a display screen 160, is coupled to the I/O bus 150. The display screen 160 may show a user interface of the document browsing application 140 that displays documents to a user. One or more input devices 170, such as a keyboard, a touchpad, separate controls (e.g., separate buttons, switches, sliders) etc., are provided and used for interaction with the portable electronic device 100, and the applications executing on the device. The separate controls preferably include a user-selectable activation control (e.g., an activation button), whose operation is discussed in detail below.

Further an orientation sensor 180 may be coupled to the I/O bus 150. Such orientation sensor 180 may be rigidly affixed to the body of the portable electronic device 100, and configured to measure the orientation in space of the portable electronic device 100, for example, in three-dimensions in substantially real-time. While the orientation sensor 180 may be externally affixed to the body of the portable electronic device 100, for example, as an add-on component, it is preferably internally disposed.

In addition, an optional video camera 185, for example, a webcam, may be coupled to the I/O bus 150. As discussed below, the video camera 185 may be employed to capture images of the surrounding environment that may be processed by analysis routines to simulate an orientation sensor. In some embodiments, the video camera 185 and analysis routines may be used in place of, or in supplement to, the orientation sensor 180.

A persistent storage device 190, such as hard disk drive, a solid-state drive, or other type or persistent data store, is coupled to the I/O bus 150, and may persistently store data, including computer-executable instructions. Persistently stored data may be loaded to the volatile memory 130 when needed. For example, computer-executable instructions related to the operating system 135, the document browsing application 140, and the browsing tool 142 may be stored in the persistent storage device 190 until they are needed. Similarly data descriptive of the document 144 may be stored in the persistent storage device 180 until accessed by the document browsing application 140.

The I/O bus 150 may further be coupled to a network interface 195 that interfaces with a computer network 197. The computer network 197 may allow communication between the portable electronic device 100 and other devices, using any of a number of well known networking protocols, including wireless networking protocols. Such network communication may allow certain remote document browsing configurations, for example, configurations where some or all documents are stored on a remote system, and loaded over the network 197 when needed.

Figure 2:
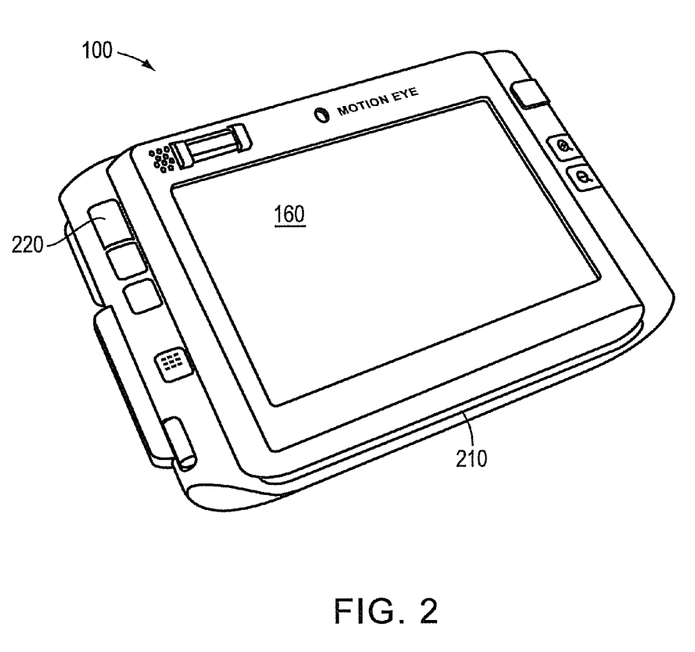
FIG. 2 is a perspective view of the example portable electronic device in which at least some of the presently described techniques may be employed.

FIG. 2 is a perspective view of the example portable electronic device 100 in which at least some of the presently described techniques may be employed. The perspective view depicts the display screen 160 as well as input devices, here a plurality of separate controls (e.g., buttons) integrated into the body 210 of the portable electronic device 100. The separate controls include the activation control (e.g., an activation button) 220. As discussed above the orientation sensor 180 (not shown in FIG. 2) is preferably internally disposed to the device 100. Further the optional video camera 185 (not shown in FIG. 2) is preferably disposed pointing to the rear of the device 100, so as to capture images surrounding environment unobstructed by the body of the user.

The above described portable electronic device 100 may be configured to implant a novel large document browsing technique that uses the orientation of the portable electronic device 100, in conjunction with the state of the activation control (e.g., an activation button) 220, to control navigation within a document (e.g., a large document) 144 being displayed on the display screen 160 of the device 100. In one embodiment, upon launch of the browsing tool, the orientation sensor 180, or one or more devices configured to simulate an orientation sensor (e.g., a webcam operating in conjunction with image capture and analysis routines), are initialized and begin capturing orientation data. The orientation data preferably indicates the portable electronic device's orientation in space substantially in real-time. When the activation control 220 (e.g., the activation button) is selected (e.g., pressed), the orientation data is read, until the activation control 220 is released (e.g., un-pressed). The read data is translated substantially in real-time into navigation commands implemented by the document browsing application 140.

A user may open a desired large document 144 in the document browsing application 140. To pan within the large document 144, the user selects the activation control 220, and turns the portable electronic 100 device left, right, up, down or a combination thereof. That is, the user selects the activation control (e.g., the activation button), and changes the yaw, pitch or both of the portable electronic device 100 relative to a fixed reference coordinate system.

Figure 3:
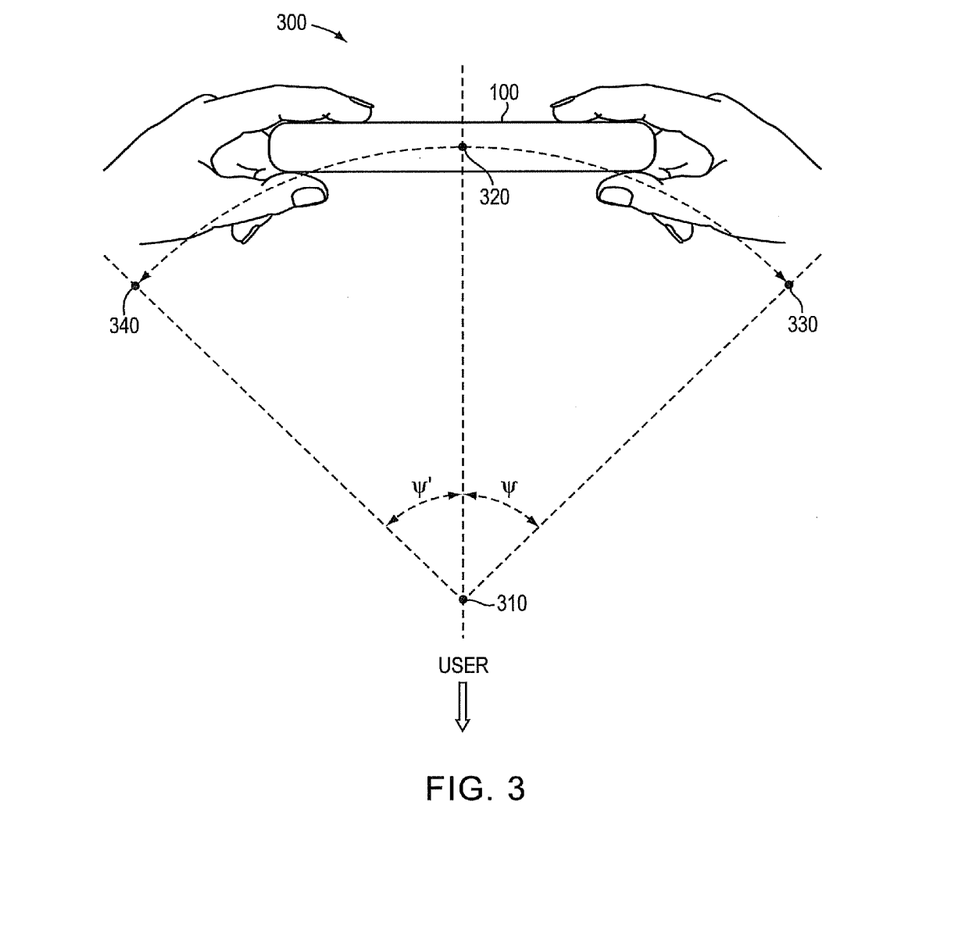
FIG. 3 is a schematic diagram illustrating a change of yaw of the example portable electronic device relative to a fixed reference coordinate system.

FIG. 3 is a schematic diagram 300 illustrating a change of yaw of the example portable electronic device 100 relative to a fixed reference coordinate system having an origin 310. A user of the portable electronic device 100 may begin with the device at position 320. The user may select the activation control 220 and right-handedly turn the device 100 through a yaw angle Ψ about an axis (not shown) through the origin 310, to bring the device 100 to a position 330. Similarly, the user may select the activation control 220 and left-handedly turn the device 100 through a yaw angle Ψ' about an axis (not shown) through the origin 310, to bring the device 100 to a position 340.

Figure 4:
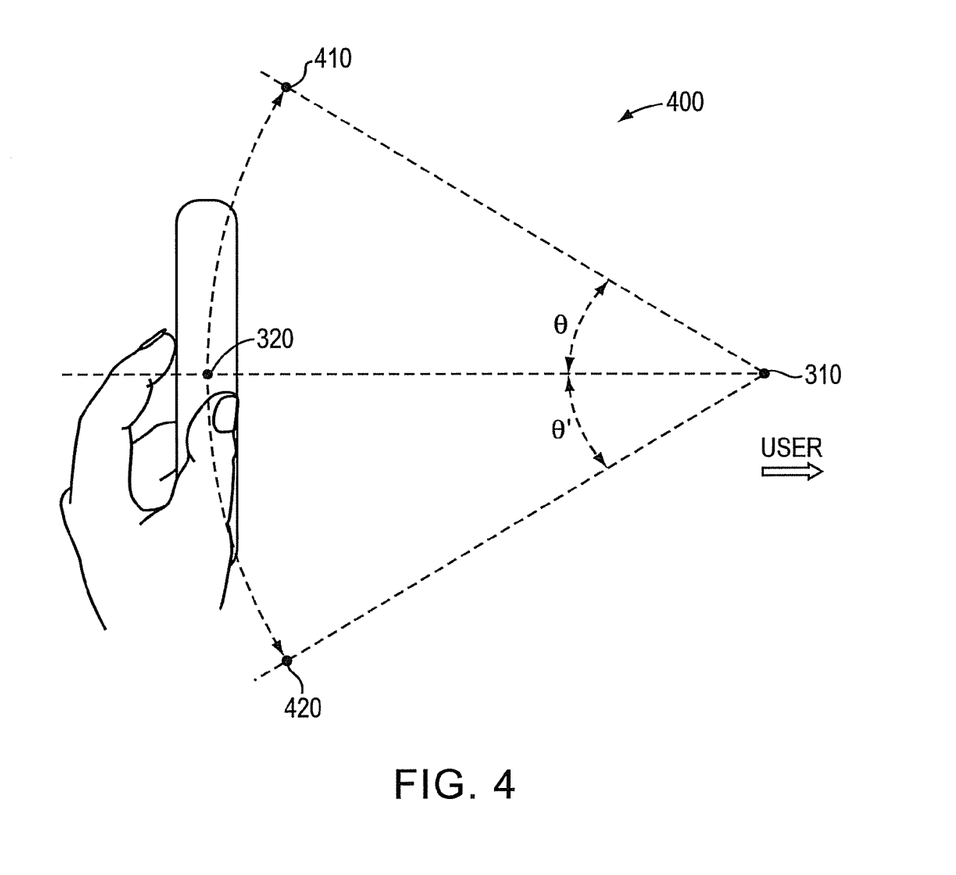
FIG. 4 is a schematic diagram illustrating a change of pitch of the example portable electronic device relative to a fixed reference coordinate system.

FIG. 4 is a schematic diagram 400 illustrating a change of pitch of the example portable electronic device 100 relative to a fixed reference coordinate system having an origin 310. A user of the portable electronic device 100 may begin with the device at position 320. The user may select the activation control 220 and upwardly turn the device 100 through a pitch angle θ about an axis (not shown) through the origin 310, to bring the device 100 to a position 410. Similarly, the user may select the activation control 220 and downwardly turn the device 100 through a pitch angle θ' about the axis (not shown) through the origin 310 to bring the device 100 to position 420.

The above described movements are translated by the browsing tool 142, preferably at a fixed gain, to corresponding left, right, up or down pan commands to control display of the large document 144 shown in the document browsing application 140. When the activation control 220 is released, panning is ceased, and further turning (i.e. yaw or pitch) of the portable electronic device 100 does not cause further panning. A user who desires to pan through a large area in the document 144 simply selects the activation control 220, turns (i.e. yaws or pitches) the device 100 through a comfortable range or motion, releases the activation control 220, returns the device to its original orientation (e.g., at position 320) (or any other comfortable starting orientation), and repeats as many times as needed to achieve the desired pan.

Since the activation control 220 permits the user to turn the device 100 through several limited ranges of motion, which aggregate to a larger turn, panning may be quite comfortable to the user. Further, since panning is preferably implemented at a fixed gain (that is, the ratio between units of panning within the document 144 to change in angles Ψ and θ remains the same through a panning operation), panning may be performed with great precision; precision far greater than that achievable with acceleration based techniques.

To zoom within the large document 144, the user selects the activation control 220, and rotates the portable electronic device 100 clockwise or counter clockwise. That is, the user selects the activation control 220, and changes the roll of the portable electronic device 100.

Figure 5:
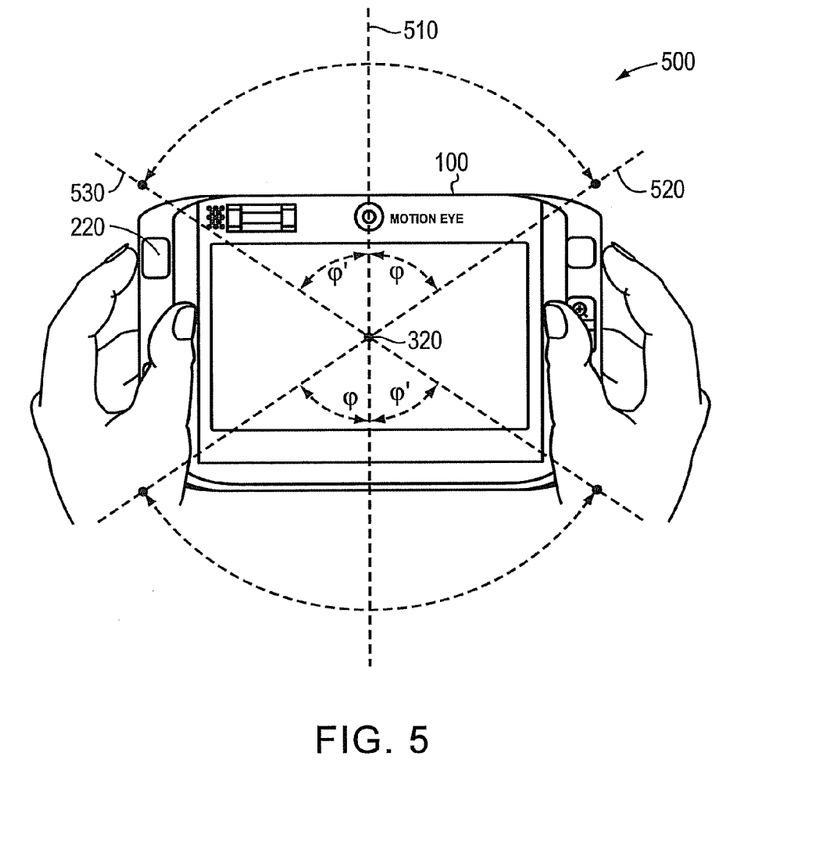
FIG. 5 is a schematic diagram illustrating a change in roll of the example portable electronic device.

FIG. 5 is a schematic diagram 500 illustrating a change in roll of the example portable electronic device 100. A user of the portable electronic device 100 may begin with the device oriented parallel to axis 510, which extends though the center (here coinciding with position 320) of the device 100. The user may select the activation control 220 and rotate the device 100 through a roll angle Φ about an axis (not shown) through the center of the device (here 320) to bring the device to be aligned with line 520. Similarly, the user may select the activation control 220 and rotate the device 100 through a roll angle Φ' about the axis (not shown) through the center of the device (here 320) to bring the device to be aligned with line 530.

A rotation (i.e. roll) in a first predetermined direction (e.g., clockwise by roll angle Φ) is translated by the browsing tool 142 to a "zoom in" command for the document 144 shown in the document browsing application 140, while a rotation (i.e. roll) in a second predetermined direction (e.g. counterclockwise by roll angle Φ') is translated to a "zoom out" command. When the activation control 220 is released, zooming is ceased, and further rotation (i.e., roll) applied to the portable electronic device 100 does not cause further zooming. A user who desires to zoom though a large range simply selects the activation control 220, rotates (i.e. rolls) the device 100 through a comfortable range (e.g., a rotation of up to 90°), releases the activation control 220, returns the device to its original orientation parallel to axis 510 (or any other comfortable starting orientation, for instance, the device being aligned with line 520), and repeats as many times as needed to achieve the desired change in zoom.

Since the activation control 220 permits the user to rotate the device 100 through several limited ranges of motion, which aggregate to a larger rotation, zooming may be quite comfortable to the user. Further, since a user generally has greater control when performing a rotation than other types of movement, zooming may be performed with precision far greater than that achievable with other techniques.

The above described panning and zooming may be used separately, or in conjunction, to navigate large documents in a variety of manners. For example, a user who wishes to pan over a large area in a document 144 may zoom out by rotating, pan by turning, and then zoom back in via further rotation. Such a sequence of steps will have the effect of a pan over a large area, as panning when zoomed out typically will cover more document area than when zoomed in.

Figure 6:
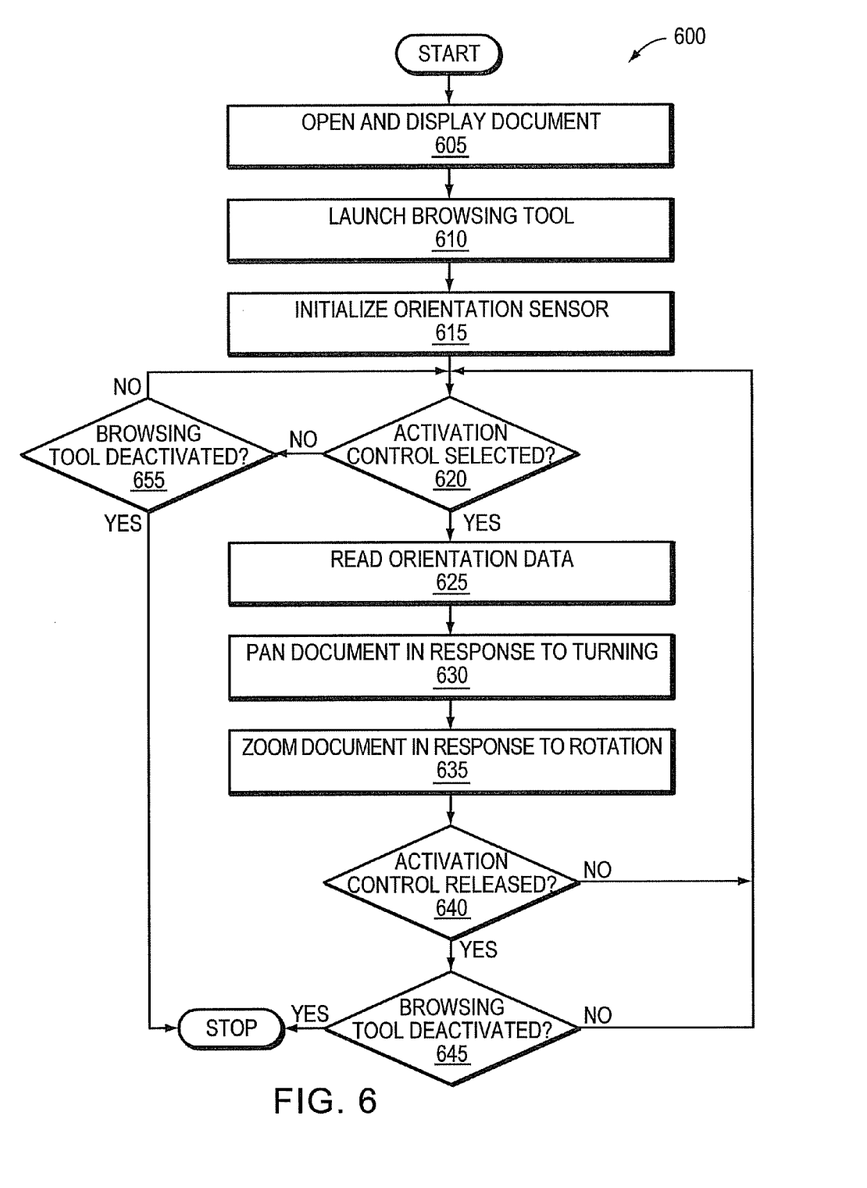
FIG. 6 is a flow diagram illustrating an example sequence of steps for translating orientation of the example portable electronic device, in conjunction with a state of an activation control, into navigation commands for a document being displayed.

FIG. 6 is a flow diagram illustrating an example sequence of steps 600 for translating orientation of the example portable electronic device 100, in conjunction with the state of the activation control 220, into navigation commands for a document 144 being displayed. While the steps in FIG. 6 are depicted in a particular order, it should be understood that the steps may be implemented in a variety of different orders, depending on the particular implementation. At step 605, a large document 144 is opened and displayed in the document browsing application 140. At step 610, the browsing tool 142 is launched. The launch of the browsing tool 142 may be triggered by the document browsing application 140, by the operating system 135, manually by a user, or by some other mechanism. At step 615, the orientation sensor 180, or one or more other devices configured to simulate the operation of an orientation sensor, are initialized and begin capturing orientation data substantially in real-time.

At decision step 620, it is determined if the activation control (e.g., the activation button) is in a selected (e.g., pressed) state. If the answer is no (i.e. the activation control is in a released (e.g., un-pressed) state), it is determined at decision step 655 if the browsing tool 142 has been deactivated, for example, in response to a user command. If the answer is no, execution loops back to decisions step 620. If the answer is yes, the sequence of steps terminates.

If the answer is yes at decision step 620 (i.e. the activation control is in a selected state), execution proceeds to step 625, where orientation data from the orientation sensor 180 (or one or more devices configured to simulate the operation of an orientation sensor) is read. At step 630, in response to any turning the device 100 left, right, up, down or a combination thereof (i.e. any change in yaw, pitch or both) indicated in the orientation data, the document 144 shown in the document browsing application 140 is panned in a corresponding manner. At step 635, in response to any rotation of device 100 clockwise or counter clockwise (i.e. any change in roll) indicated in the orientation data, the document 144 shown in the document browsing application 140 is zoomed in or zoomed out as described above.

At decision step 640, it is determined if the activation control (e.g., the activation button) has been released (e.g., un-pressed). If the answer is no (i.e the activation control is still in a selected state), execution loops back to step 620. If the answer is yes, (i.e. the activation control is now in a released (e.g., unpressed) state), execution proceeds to decision step 645, where it is determined if the browsing tool 142 has been deactivated, for example, in response to a user command. If the answer is no, execution loops back to decision step 620. If the answer is yes, the sequence of steps terminates.

While many portable electronic devices are currently manufactured to include internally mounted orientation sensors 180, or may be retrofitted with an externally disposed orientation sensor, the above described techniques may be extended to devices that do not include an orientation sensor. In such cases, information gathered from other sources may be employed to simulate an orientation sensor and supply the orientation data used in the above described techniques.

Figure 7:
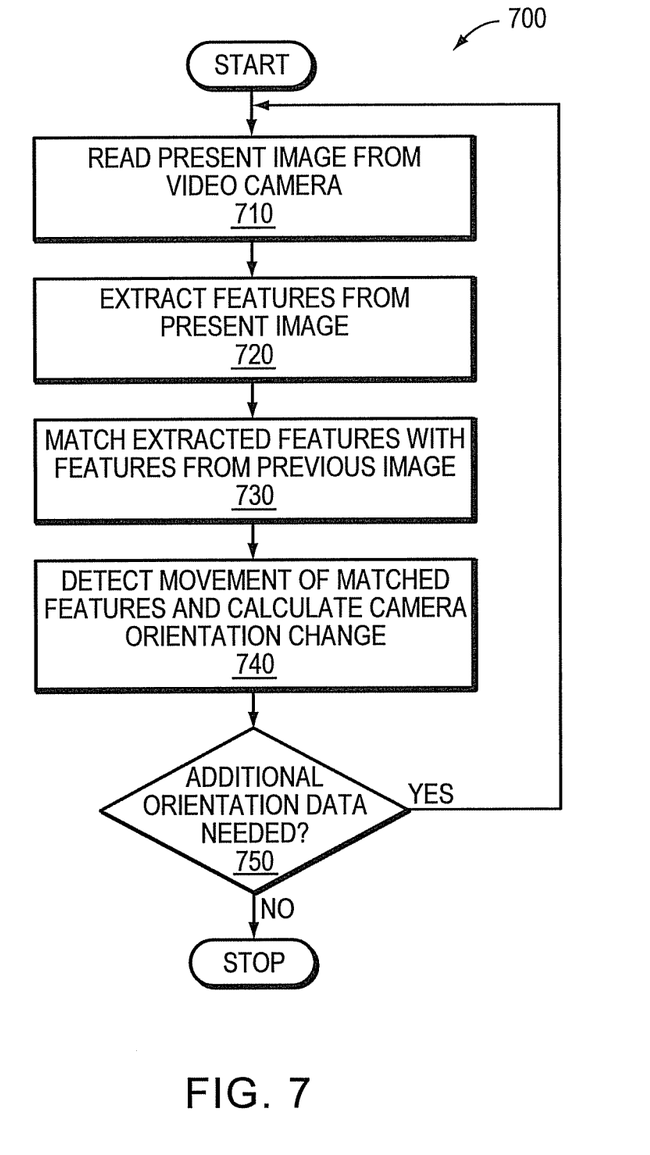
FIG. 7 is a flow diagram illustrating an example sequence of steps for simulating an orientation sensor using a video camera, for example, a webcam, affixed to the example portable electronic device.

FIG. 7 is a flow diagram illustrating an example sequence of steps 700 for simulating an orientation sensor using a video camera 185, for example, a webcam, rigidly affixed to the example portable electronic device 100. While the steps in FIG. 7 are depicted in a particular order, it should be understood that the steps may be implemented in a variety of different orders, depending on the particular implementation. At step 710, a present image is read from the video camera 185. The image preferably depicts the physical surroundings of the portable electronic device 100, for example, any walls, objects, terrain, or other surroundings of the device 100. At step 720, one or more features of the present image are extracted (e.g., "isolated") to use as spatial references. At step 730, the one or more extracted features are matched to corresponding extracted features from a previous image. The previous image was preferably captured a short period of time prior to the capture of the present image (e.g., a few tens of milliseconds prior). At step 740, the movement of the matched features with respect to the image is detected and the camera's orientation change calculated there from. For example, should the one or more matched features be determined to have moved to the left between the previous image and the present image, it may be inferred that the video camera 185, and thus the portable electronic device 100 to which the video camera 185 is rigidly attached, moved to the right. The calculated orientation change is supplied as orientation data for use in the above described large document browsing techniques. At step 750, it is determined if additional orientation data is needed. If the answer is yes, execution loops to step 710. If the answer is no, the sequence of steps terminates.

While the above description discusses various embodiments of the present disclosure, it should be apparent that a number of modifications and/or additions may be made without departing from the disclosure's intended spirit and scope.

For example, the above described techniques may be implemented in software, in hardware, or a combination thereof. A software implementation may include computer-executable instructions stored in a computer-readable medium, such as a volatile or persistent memory, a hard-disk, a compact disk (CD), etc. A hardware implementation may include processors, memories, programmable logic circuits, application specific integrated circuits, and/or other types of hardware components. Further, a combined software/hardware implementation may include both computer-executable instructions stored in a computer-readable medium, as well as one or more hardware components. Accordingly, it should be understood that the above descriptions are meant to be taken only by way of example.

What is claimed is:

1. A method for browsing a document on a portable electronic device, comprising:
   opening and displaying the document in a document browsing application executing on the portable electronic device;
   determining a state of a user-selectable activation control disposed on the portable electronic device;
   in response to the activation control being in a selected state, reading orientation data from a sensor of the portable electronic device, the orientation data indicating the portable electronic device's orientation in space;
   determining from the orientation data that the portable electronic device has rotated in a first predetermined direction about an axis that extends perpendicular to a front of a display screen of the portable electronic device through a center of the display screen of the portable electronic device, and causing the document browsing application to zoom in on a portion of the document being displayed in response to the rotation;
   is in response to the activation control being in a released state, ceasing zooming in response to any further rotation of the portable electronic device.

2. The method of claim 1 further comprising:
   determining from the orientation data that the portable electronic device has rotated in a second predetermined direction about the axis that extends through the center of the portable electronic device, and causing the document browsing application to zoom out on the document being displayed in response to the rotation.

3. The method of claim 1 further comprising:
   determining from the orientation data that the portable electronic device has turned in reference to a fixed coordinate system and causing the document browsing application to pan up, down, left or right in response to the turn; and
   in response to the activation control being in the released state, ceasing panning in response to any further turn of the portable electronic device.

4. The method of claim 3 further comprising:
   repeating the steps of determining a state, reading orientation data, determining from the orientation data that the portable electronic device has turned, and ceasing panning, two or more times to achieve a desired pan.

5. The method of claim 3 wherein there is fixed gain between units of panning within the document and an angle of turning of the portable electronic device.

6. The method of claim 1 further comprising:
   repeating the steps of determining a state, reading orientation data, determining from the orientation data that the portable electronic device has rotated in a first predetermined direction, and ceasing zooming, two or more times to achieve a desired zoom in.

7. The method of claim 1 wherein the activation control is an activation button, and the selected state is where the button is pressed, and the unselected state is where the button is un-pressed.

8. The method of claim 1 wherein the sensor is an orientation sensor.

9. The method of claim 8 further comprising;
   measuring, by the orientation sensor, the portable electronic device's orientation in space in three-dimensions in substantially real-time.

10. The method of claim 1 wherein the sensor is a video camera operating in conjunction with image capture and analysis routines.

11. The method of claim 10 further comprising:
reading a present image from the video camera;
extracting one or more features from the present image;
matching the one or more extracted features with features from a previous image, previously captured by the video camera;
detecting movement of matched features and calculating therefrom orientation change of the portable electronic device.

12. The method of claim 1 wherein the document is a two-dimensional document.

13. The method of claim 1 wherein the document is a computer aided design (CAD) drawing.

14. A portable electronic device, comprising:
a display screen;
a processor;
a sensor rigidly coupled to a body of the portable electronic device and configured to generate orientation data, the orientation data indicating the portable electronic device's orientation in space;
a user-selectable activation control disposed on the exterior of the body of the portable electronic device; and
a memory configured to store instructions for execution on the processor, the instructions for
a document browsing application configured to open and display a document on the display screen, and
a browsing tool configured to determine a state of the user-selectable activation control, read the orientation data from the sensor in response to the activation control being in a selected state, and in response to the orientation data indicating that the portable electronic device has rotated in a first predetermined direction about an axis that extends perpendicular to a front of the display screen of the portable electronic device through a center of the display screen of the portable electronic device, cause the document browsing application to zoom in on a portion of the document being displayed on the display screen.

15. The portable electronic device of claim 14, wherein the document browsing tool is further configured to, in response to the activation control being in a released state, cease zooming in response to any further rotation of the portable electronic device.

16. The portable electronic device of claim 14, wherein the document browsing tool is further configured to determine from the orientation data that the portable electronic device has rotated in a second predetermined direction about the axis that extends through the center of the portable electronic device, and to cause the document browsing application to zoom out on the document displayed on the display screen.

17. The portable electronic device of claim 14, wherein the document browsing tool is further configured to determine from the orientation data that the portable electronic device has turned in reference to a fixed coordinate system and to cause the document browsing application to pan up, down, left or right in response to the turn.

18. The portable electronic device of claim 17, wherein there is fixed gain between units of panning within the document an angle of turning of the portable electronic device.

19. The portable electronic device of claim 14, wherein the activation control is an activation button, and the selected state is where the button is pressed, and the unselected state is where the button is un-pressed, and the sensor is an orientation sensor.

20. A portable electronic device, comprising:
a display screen;
means for generating orientation data indicating the portable electronic device's orientation in space;
means for receiving a user's activation selection;
means for opening and displaying a document on the display screen; and
means for determining a state of the means for receiving a user's activation selection, reading the orientation data in response to the means for receiving a user's activation selection being in a selected state, determining from the orientation data that the portable electronic device has rotated in a first predetermined direction about an axis that extends perpendicular to a front of the display screen of the portable electronic device through a center of the display screen of the portable electronic device, and zooming in on a portion of the document displayed on the display screen in response to the rotation, and in response to the means for receiving a user's activation selection being in a released state, ceasing zooming in response to any further rotation of the portable electronic device.

* * * * *